Patented Sept. 18, 1945

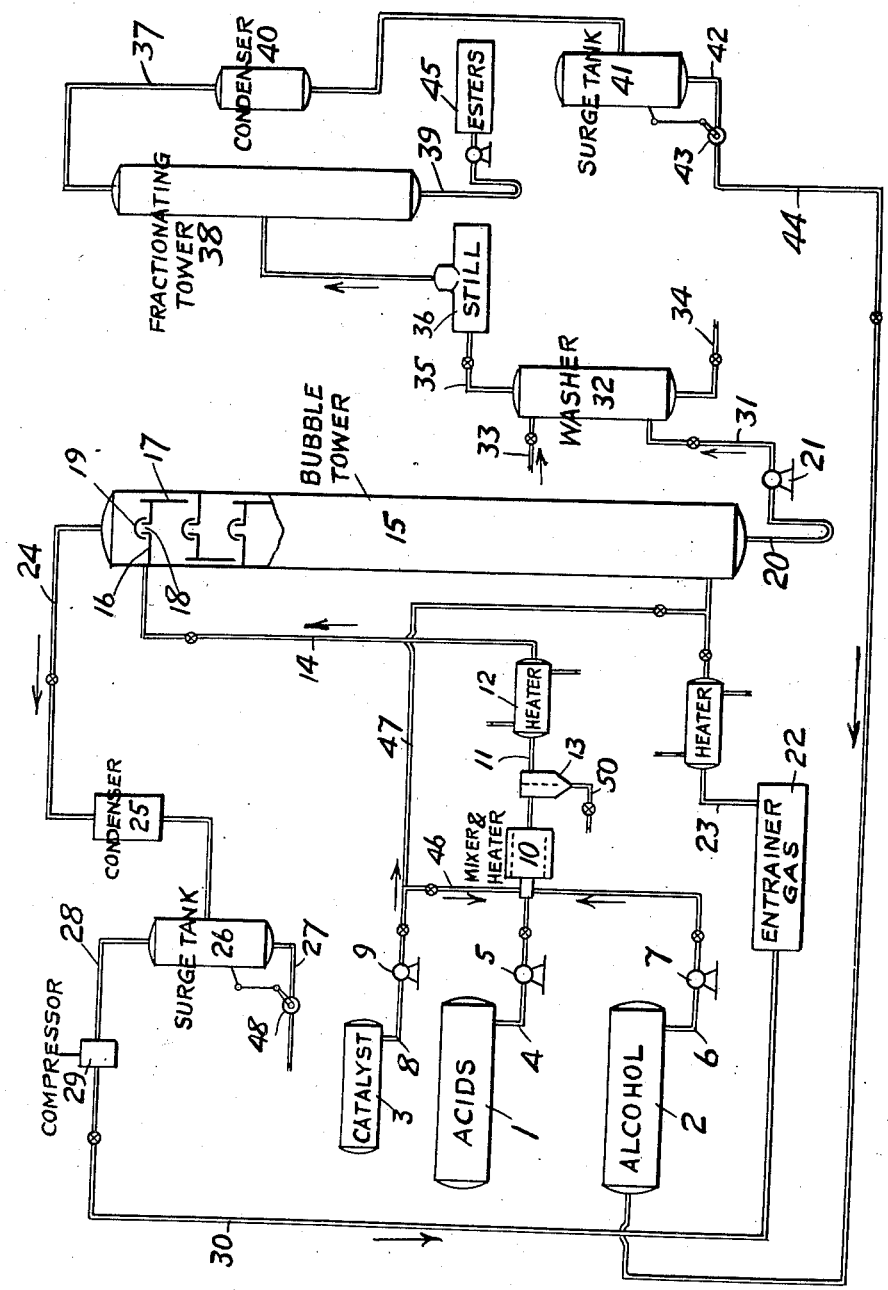

2,384,793

UNITED STATES PATENT OFFICE 2,384,793

METHOD OF ESTERIFICATION

Johannes H. Bruun, Swarthmore, and John Harold Perrine, Prospect Park, Pa., assignors to Sun Oil Company, Philadelphia, Pa., a corporation of New Jersey Application August 7, 1942, Serial No. 454,042

2 Claims. (Cl. 260—410)

The present invention relates to a method of producing esters and is particularly concerned with a method of producing esters by reacting a relatively high molecular weight acid with a relatively high molecular weight alcohol under such conditions that the acid and alcohol being reacted, as well as the esters produced, remain in liquid phase during the esterification reaction. The invention is particularly directed to a novel continuous catalytic method of producing esters of the above type in such a manner that a much higher than ordinary equilibrium is reached in a very short time, giving a high yield of good quality ester.

For better understanding of the present invention, reference should be made to the accompanying drawing, the single figure of which is a flow chart of an apparatus suitable for practicing the present invention.

In the drawing, 1 designates a storage tank for organic acids to be esterified, 2 represents a storage tank for the alcohol to be esterified, while 3 represents a storage tank for the catalyst to be employed during the esterification reaction. The acids are withdrawn from tank 1 through valved line 4 by pump 5, alcohol is withdrawn from tank 2 through valved line 6 by pump 7 and the catalyst is withdrawn from tank 3 through valved line 8 by pump 9. The proper proportions of reactants and catalyst, flowing through lines 4, 6 and 8 are introduced into mixer and heater 10 where they are intimately mixed and preferably slightly heated. From mixer 10 the mixed reactants and catalyst flow through line 11 to heater 12 wherein they are heated to the desired reaction temperature by heat exchange with suitable heating medium. If necessary, a trap 13 may be provided in line 11 between mixer 10 and heater 12 in order to remove from the mixed reactants any sludge formed on mixing. From heater 12, the mixed reactants flow through valved line 14 to the top tray of bubble cap column 15.

The bubble cap column 15 is of conventional design and the mixed reactants flow downwardly therethrough in liquid phase in the usual manner, a pool of liquid being maintained on each tray 16 and the liquid overflowing through downcomer 17 to the next lower tray and so through the column. Vapors rise through the column through vapor risers 18 and are forced to bubble through the pool of liquid on each tray by double caps 19.

The reactants and catalyst in bubble cap column 15 are maintained at the desired reaction temperature and during their downward course through the column, the alcohols and acids react to form esters, so that the liquid overflowing from the bottommost tray in the column contains a substantial amount of esters. The esterified product is withdrawn from bubble tower 15 through trapped line 20 by pump 21 and passes to suitable storage, or purification means, as hereinafter are more fully described.

An inert entrainer gas, withdrawn from storage tank 22 through valved line 23, is admitted into the lowermost portion of the bubble cap column 15 and rises therethrough in vapor phase in the usual manner. Under the conditions employed in the bubble cap column 15, the water formed by the esterification reaction will be vaporized and will pass out the top of the column along with the entrainer gas. The mixed entrainer gas and water vapors are removed from the bubble cap column 15 through valved line 24 and pass to condenser 25 wherein the water is condensed. Thence, the mixed water and gas flow to surge tank 26, the water being withdrawn from the bottom thereof through line 27 having a float controlled valve 48 therein. The entrainer gas is withdrawn from the top of tank 26 through line 28, is recompressed by compressor 29 and flows through valved line 30 back to storage tank 22 for reuse.

The esterified product withdrawn from the bottom of bubble cap column 15 through trapped line 20 by pump 21 may flow through valved line 31 to suitable purification means. Such purification means are here illustrated as a wash tank 32, the mixed esters, with any unreacted alcohols and acids contained therein, being introduced at a point near the bottom of tank 32 while the aqueous solution of a suitable alkali, an alkali metal or an alkaline earth metal, hydroxides or their equivalent, is introduced at a point near the top of tank 32 through valved line 33. In wash tank 32 any unreacted acids are converted into their corresponding soaps and are washed from the rising stream of esters and unreacted alcohols, the soap solution being withdrawn from the tank 32 through valved line 34 and removed from the system, although, of course, it is to be understood that the acids may subsequently be recovered and recirculated. The mixed esters and alcohols free of unreacted acids are removed from the top of wash tank 32 through valved line 35 and may then flow through suitable apparatus for separating the esters from the alcohol. Suitable separation equipment is here illustrated as a still 36 in which the alcohol and esters are heated and vaporized. The vapors pass to fractionating column 36, the lower boiling constituent being withdrawn therefrom as an overhead vapor fraction through line 37 while the higher boiling constituent condensed therein is withdrawn therefrom through line 38.

Assuming that the alcohol is lower boiling than the ester produced, it will be the alcohol which is removed overhead through line 37 and it may pass therethrough to condenser 40 wherein it is cooled and condensed and through which it flows to surge tank 41 from which the alcohol is removed through line 42 having float controlled valve 43 therein and thence it may flow through valved line 44 back to alcohol storage tank 2 for recirculation through the system.

The esters removed from vaporizer 36 through line 38 by pump 39 may be pumped to storage tank 45.

The foregoing is a brief outline of the flow of reactants through our process. There are a number of variable factors in the process and the exact conditions of reaction are a function of the inter-relation of the numerous variable factors effecting the reaction. The principal variables in the process are the type and quantity of the acids being esterified, the type and quantity of alcohol employed, the type and quantity of catalyst employed, the temperature of reaction, the time of reaction and the pressure of reaction. The yield obtained, both qualitatively and quantitatively, is, as stated, a function of the inter-relation of all these variable factors. With a given acid, alcohol and catalyst, we have found that the temperature and time of the reaction, exert the greatest influence. The present invention is adapted to be carried out at low pressure, atmospheric or slightly above or below atmospheric, and reasonable variations in pressure do not greatly affect the yield of esters. The time of reaction has a marked effect on the yield and it is necessary to permit a sufficient time of reaction for the desired degree of esterification to take place under the other conditions employed. Like most processes, the temperature has a marked effect on the yield and also on the time required for the desired equilibrium to be reached. We have found that within the range where esterification will proceed, an increase in temperature of about 10° C. approximately doubles the rate of reaction. Too high a temperature should not be employed since excessive temperatures will result in discoloration of the product and deposition of charred matter in the reaction zone.

We have found that the temperature of reaction should be at least 100° C. in order that the relatively high equilibrium may be reached in a reasonable length of time. However, the temperature should not be much over 150° C. or certain of the products will be discolored. As a practical matter, we believe that a temperature of about 135° C. is best suited to give a high yield of good quality esters in a reasonable period of time. At this temperature, 135° C., about 20 minutes reaction time is required in order to produce a product having an acid number less than 4. Since a product with this acid number is suitable for many commercial uses, we prefer to directly, in accordance with our process, produce a product of this quality and, therefore, preferably provide a reaction time sufficient for a product of such quality to be produced. However, it should be understood that a product (ester) of lower quality, i. e., one having a higher acid number, may be produced by shortening the time of reaction or lowering the temperature of reaction and the product may then subsequently be further purified, for instance, by washing with an alkali to remove the unreacted acid, as hereinbefore described.

The present process is particularly adapted to esterifying acids having a boiling point above the temperature employed for the reaction. The acids, which we prefer to employ, are acids having physical properties similar to the usual fatty acids. Any of the ordinary fatty acids may be employed, oleic, stearic, palmitic, and the like; or acids derived from petroleum, either those naturally present therein, generally called naphthenic acids, or those obtained by partial oxidation of selected fractions of petroleum.

A great many catalysts are suitable for use in the present process. The catalyst commonly used in commercial esterification processes is sulfuric acid but numerous other catalysts have been proposed and may be employed. Suitable examples of such other catalysts are hydrochloric acid, or other strong mineral acids. However, it must be borne in mind that any strong acid may cause decomposition of a tertiary alcohol. Phosphoric acids are less destructive and may be employed. The sulfonic acids, particularly those containing several carbon atoms, are desirable catalysts on account of their high efficiency, solubility and less destructive action. Acid salts, such as monosodium sulfate and salts of any strong acids with weak bases, such as aluminum sulfate, may be employed. Zinc chloride has been found to be superior to other chlorides when used along with hydrochloric or sulphuric acid. Metallic soaps, such as aluminum stearate or linoleate, lead oleate and magnesium oleate, are useful catalysts. If the catalyst employed is a solid or liquid, under the reaction conditions in bubble cap column 15, it is mixed with the reactants and introduced into the top of the column as described. However, if the catalyst is such that it is a vapor, under the conditions employed in bubble cap column 15, for instance gaseous hydrochloric acid, the valve in line 46 is closed and the valve in line 47 is opened so that the gaseous catalyst is introduced into the bottom of bubble cap column 15 along with the entrainer gas flowing through valved line 23. The gaseous catalyst then passes up through the column in vapor phase and is intimately mixed with the reactants therein.

The amount of catalyst, which it is necessary to add to the reactants, is relatively small. We have found that no substantial improvement in the yield is obtained when the amount of catalyst employed exceeds 5 per cent by weight of the acids being esterified. We have obtained very satisfactory yields using approximately 3.2 per cent or less of sulphuric acid as a catalyst by weight of the acids being esterified.

The exact proportion of reactants which must be employed is subject to considerable variation. However, one of the advantages of our process is that a high yield of good quality ester may be obtained when using a relatively small amount of alcohol. We have found that there is no substantial improvement in the yield of esters, either qualitatively or quantitatively, when the ratio of alcohol to acids is increased above 2 to 1. A somewhat lower ratio may be employed by making a slight sacrifice in the quantity of the esters produced.

When the acids to be esterified are those derived from petroleum, there is frequently present therein acid impurities which are readily attacked by, or react with, sulphuric acid on mixing to form sludge-like products. We, therefore, provide the trap 13 in line 11 in order to remove such sludge-like products before the mixture is introduced into bubble cap column 15, the sludge being removed from trap 13 through valved line 50 constantly or intermittently as desired.

In order to better describe the present invention, the following example is given.

Purified naphthenic acids, obtained by partial oxidation of a naphthenic type kerosene and which had an average molecular weight of 225 and an acid number of 220, were employed. The alcohol employed was commercial lauryl alcohol. These acids and alcohol were mixed, a molar ratio of alcohol to acids of 2 to 1 employed, and 3.2 per cent sulphuric acid was mixed with the reactants to serve as a catalyst. During mixing the reactants were heated to 60° C. A small amount of sludge was formed during the mixing and was removed. The mixed reactants and catalyst were then heated to 135° C. and introduced into the top of a 40 plate bubble cap column at such a rate that 20 minutes were required for the reactants to pass through the column. The column was maintained at atmospheric pressure and was heated by a suitable heating jacket and a temperature of 135° C. was maintained throughout the column. Butane, heated to 135° C., was introduced into the bottom of the column and was used as the entrainer gas, approximately equal molar parts of butane and acids being employed. The esterified product withdrawn from the bottom of the bubble cap column was distilled in order to remove the unreacted alcohol which was recirculated. The crude esters remaining after the distillation had an acid number of 6.9, showing that a yield of 96.9 per cent of the theoretical, based on the amount of acids charged to the process, was obtained. The crude esters had a boiling point of 145°-270° C. at 1 mm. These acids were then purified by washing with sodium carbonate solution whereby most of the unreacted acids were saponified and removed. The esters were then dried and a yield of purified esters equal to 95 per cent of the crude esters was obtained. These esters had a boiling point of 150°-245° C. at 0.25 mm. and an acid number of 1.4.

We claim:

1. In the method of producing esters by reacting an alcohol with an organic acid, each of said reactants having a boiling point higher than the temperature used in the esterification reaction, the improvement which comprises forming a mixture of the acid and the alcohol, flowing a stream of the mixture downwardly through a reaction zone maintained at a temperature of 100-150° C. and countercurrent to a stream of inert gas, intimately commingling said mixture with said inert gas within said reaction zone in the presence of an esterification catalyst whereby the inert gas first comes in contact with a mixture containing a predominant proportion of esters and lastly comes in contact with the unesterified mixture of acids and alcohol, maintaining said reactants within said zone for a relatively short time but sufficient to obtain a high degree of esterification, withdrawing the esterified product from said zone at a locus near the locus of introduction of the inert gas and withdrawing the inert gas and water produced in the esterification reaction from said zone at a locus near the locus of introduction of the reactants.

2. The method defined in claim 1 wherein a molar ratio of alcohol to organic acid approximating but not substantially exceeding 2:1 is used to form the reaction mixture.

JOHN HAROLD PERRINE.
JOHANNES H. BRUUN.